(12) United States Patent
Kohata

(10) Patent No.: US 12,293,586 B2
(45) Date of Patent: May 6, 2025

(54) COMPUTER-READABLE RECORDING MEDIUM STORING PERSON IDENTIFICATION DETERMINATION PROGRAM, PERSON IDENTIFICATION DETERMINATION METHOD, AND INFORMATION PROCESSING APPARATUS

(71) Applicant: FUJITSU LIMITED, Kawasaki (JP)

(72) Inventor: Shun Kohata, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 391 days.

(21) Appl. No.: 17/837,504

(22) Filed: Jun. 10, 2022

(65) Prior Publication Data

US 2023/0113045 A1   Apr. 13, 2023

(30) Foreign Application Priority Data

Oct. 13, 2021  (JP) .................................. 2021-168431

(51) Int. Cl.
*G06V 20/52* (2022.01)
*G06T 7/73* (2017.01)
*G06V 10/82* (2022.01)
*G06V 40/16* (2022.01)

(52) U.S. Cl.
CPC ................ *G06V 20/52* (2022.01); *G06T 7/73* (2017.01); *G06V 40/172* (2022.01); *G06T 2207/20081* (2013.01); *G06T 2207/30196* (2013.01)

(58) Field of Classification Search
CPC ...... G06V 20/52; G06V 40/172; G06V 10/82; G06T 7/73; G06T 2207/20081
See application file for complete search history.

(56) References Cited

U.S. PATENT DOCUMENTS

| 2016/0267661 | A1* | 9/2016 | Moteki | G06T 7/593 |
| 2017/0178345 | A1* | 6/2017 | Pham | G06V 10/56 |
| 2021/0034842 | A1* | 2/2021 | Kang | G06V 40/10 |

FOREIGN PATENT DOCUMENTS

| JP | 2018-061114 A | 4/2018 |
| JP | 2019-029021 A | 2/2019 |

* cited by examiner

*Primary Examiner* — Oneal R Mistry
*Assistant Examiner* — Daniel Danesh Najarian
(74) *Attorney, Agent, or Firm* — Fujitsu Intellectual Property Center

(57) ABSTRACT

A non-transitory computer-readable recording medium stores a determination program for causing a computer to execute processing including: acquiring a plurality of pieces of image data captured by each of a plurality of cameras; specifying a position of a person included in each of the plurality of pieces of image data by a first index different for each of the plurality of cameras; specifying the position of the person specified by the first index by a second index common to the plurality of cameras; and determining whether the person included in each of the plurality of pieces of image data is the same person on the basis of the specified position of the person that uses the second index.

5 Claims, 19 Drawing Sheets

COMPUTER-READABLE RECORDING MEDIUM STORING PERSON IDENTIFICATION DETERMINATION PROGRAM, PERSON IDENTIFICATION DETERMINATION METHOD, AND INFORMATION PROCESSING APPARATUS

CROSS-REFERENCE TO RELATED APPLICATION

This application is based upon and claims the benefit of priority of the prior Japanese Patent Application No. 2021-168431, filed on Oct. 13, 2021, the entire contents of which are incorporated herein by reference.

FIELD

The embodiments discussed herein are related to a determination program, a determination method, and an information processing apparatus.

BACKGROUND

With changes in lifestyles and labor shortages, purchasing behavior analysis using surveillance cameras in stores is used for the purpose of automating and improving efficiency of store operations. Examples of the purchasing behavior analysis include implementing development of new customers and improvement of store operation efficiency by estimation of purchasing characteristics of consumers by behavior analysis from a buying situation in a store and detection of suspicious behavior in a self-checkout store. Note that the behavior analysis from a buying situation means to analyze which product in the store a target consumer purchases, and the detection of suspicious behavior means whether to leave the store without scanning a product in a shopping cart.

Japanese Laid-open Patent Publication No. 2019-29021 and Japanese Laid-open Patent Publication No. 2018-61114 are disclosed as related art.

SUMMARY

According to an aspect of the embodiments, a non-transitory computer-readable recording medium stores a determination program for causing a computer to execute processing including: acquiring a plurality of pieces of image data captured by each of a plurality of cameras; specifying a position of a person included in each of the plurality of pieces of image data by a first index different for each of the plurality of cameras; specifying the position of the person specified by the first index by a second index common to the plurality of cameras; and determining whether the person included in each of the plurality of pieces of image data is the same person on the basis of the specified position of the person that uses the second index.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
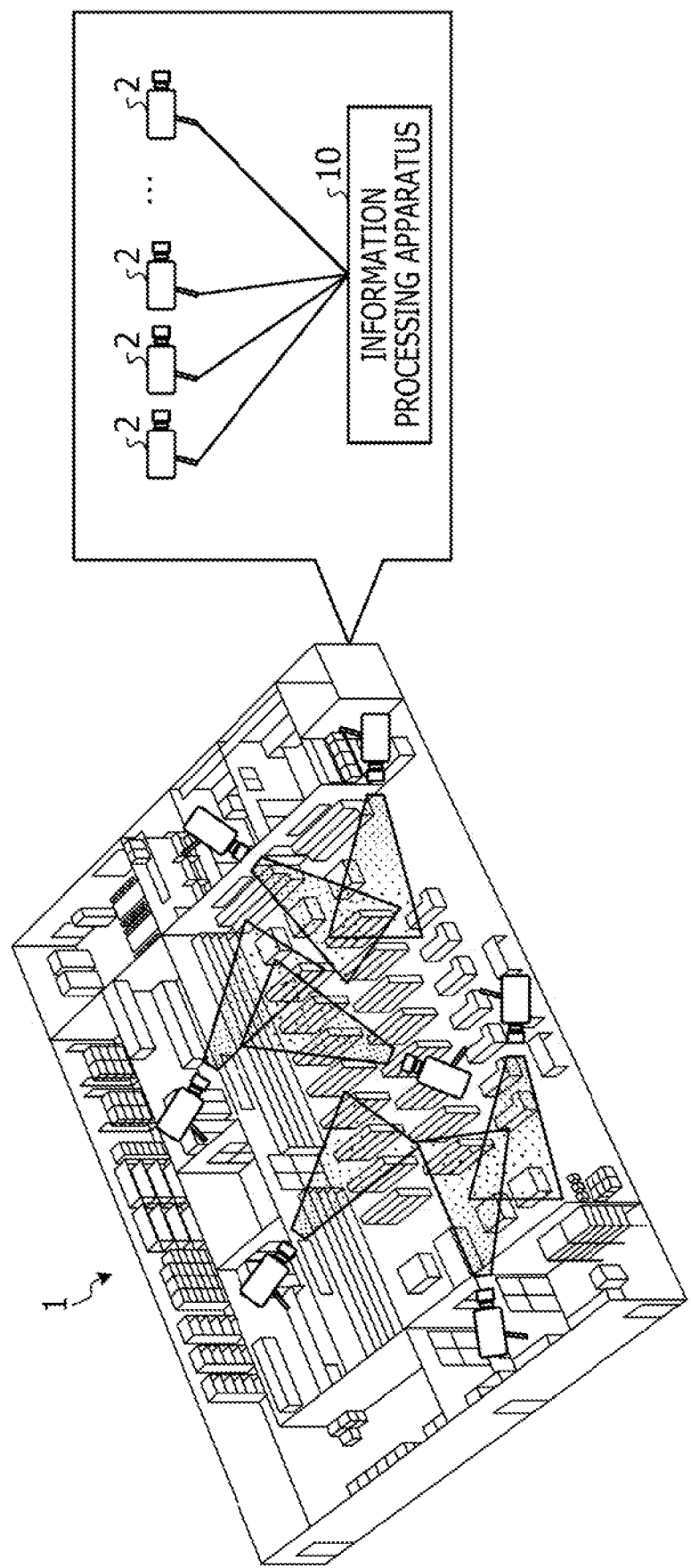
FIG. 1 is a diagram illustrating an example of an overall configuration of a system according to a first embodiment.

In recent years, in order to analyze purchasing behavior in various stores, a person tracking technology using a plurality of surveillance cameras installed in a store has been used. As the person tracking technology, a same person tracking technology in which a person detection model and a person identification model are combined is known. For example, in the same person tracking technology, the person detection model detects a bounding box from an image of each surveillance camera, and the person identification model identifies whether or not the bounding box of a person in each frame of each surveillance camera is the same person.

However, in the technology described above, since image characteristics of learning data of each model used in the person tracking technology are often different from image characteristics of image data captured in a store where the person tracking technology is actually applied, inference accuracy of the person identification model is reduced, and misidentification of a person occurs.

For example, for each store to which the person tracking technology is applied, an angle of view and brightness of a surveillance camera are different, and furthermore, change in clothes according to seasons and fashion and a clientele such as age and race are different, and a background such as color and a pattern of a product shelf, a floor, and a column are also different. Combinations of such image characteristics are enormous, and it is not realistic to use all combinations for training.

Furthermore, since it is practically unrealistic to prepare a data set of learning data used for training each model for each store, a public data set that is open to the public is often used.

For example, the person detection model is constructed by deep learning or the like so as to receive input of image data, estimate an existence position of a person in the image data, and output an area (bounding box) of the existence position. Furthermore, the person identification model is constructed by deep learning or the like so as to receive input of image data in which bounding boxes of two persons are specified and output feature amounts (feature vectors) of those persons. Note that, in the following, image data in which a bounding box is specified may be referred to as a "bounding box image".

In this way, as learning data of each model, it is preferable to acquire bounding box images obtained by capturing the same person from various angles for a large number of persons. However, acquiring a learning data set in a real environment needs a huge cost. Furthermore, it is difficult to cover image characteristics of various stores with public data sets.

In one aspect, an object is to provide a determination program, a determination method, and an information processing apparatus that may suppress misidentification of a person.

Hereinafter, embodiments of a determination program, a determination method, and an information processing apparatus disclosed in the present application will be described in detail with reference to the drawings. Note that the present disclosure is not limited by the embodiments. Furthermore, the individual embodiments may be appropriately combined within a range without inconsistency.

First Embodiment

[Overall Configuration]

FIG. 1 is a diagram illustrating an example of an overall configuration of a system according to a first embodiment. As illustrated in FIG. 1, the system includes a store 1 as one example of a space, a plurality of cameras 2 installed at different locations in the store 1, and an information processing apparatus 10.

Each of the plurality of cameras 2 is one example of a surveillance camera that captures a predetermined area in the store 1, and transmits data of a captured video to the information processing apparatus 10. In the following description, data of a video may be referred to as "video data". Furthermore, the video data includes a plurality of time-series image frames. To each image frame, a frame number is assigned in a time-series ascending order. One image frame is image data of a still image captured by the camera 2 at a certain timing.

The information processing apparatus 10 is one example of a computer that analyzes each piece of image data captured by each of the plurality of cameras 2. Note that each of the plurality of cameras 2 and the information processing apparatus 10 are connected to each other by using various networks such as the Internet and a dedicated line regardless of whether the network is wired or wireless. Furthermore, a normal checkout, a self-checkout, and the like are installed in the store 1, and a store clerk holds a terminal such as a smartphone.

Figure 2:
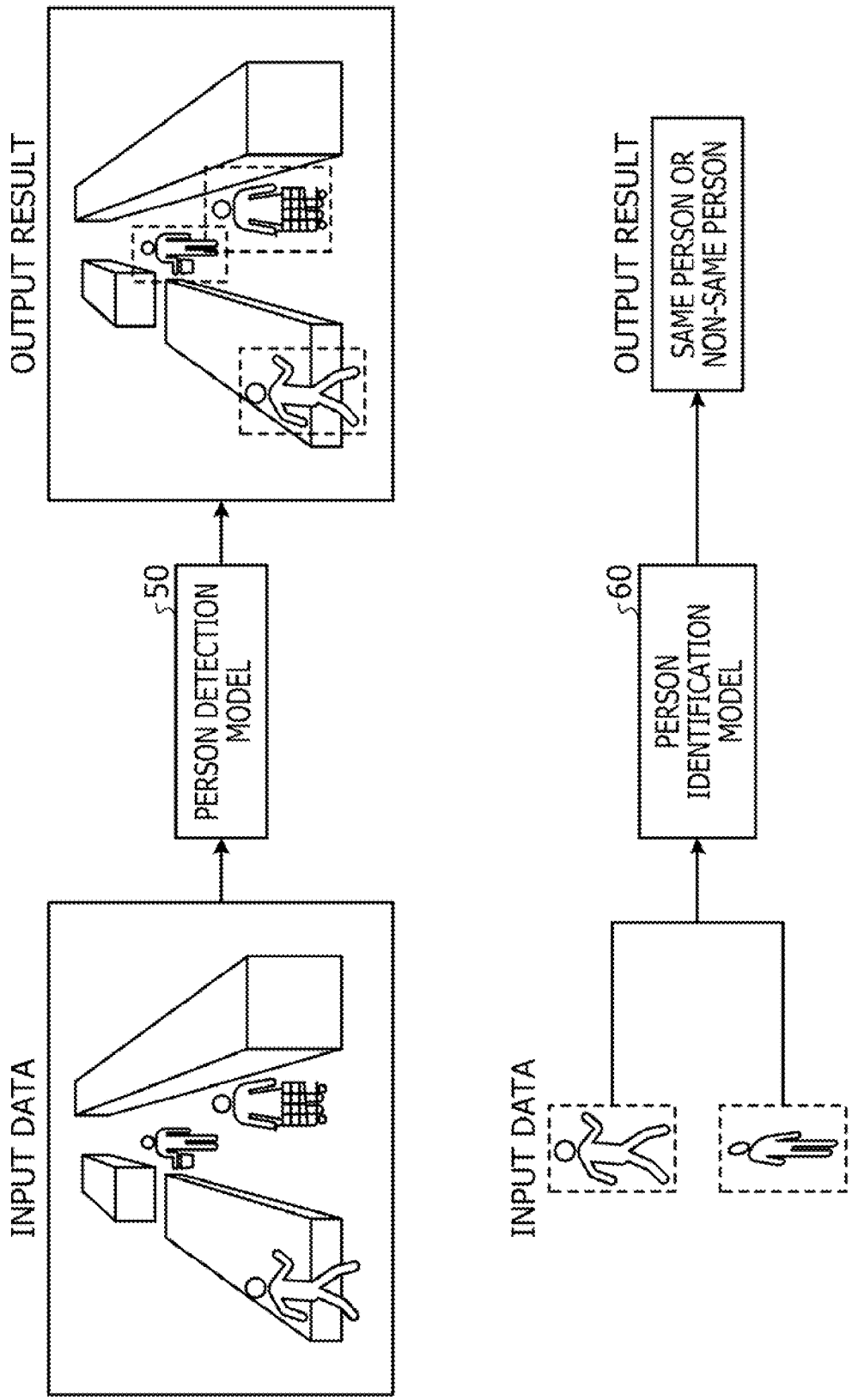
FIG. 2 is a diagram for describing a reference technology of a person tracking technology.

In recent years, in various stores (for example, stores that introduce self-checkouts and the like), in order to analyze purchasing behavior in the stores, a person tracking technology using a plurality of surveillance cameras installed in a store has been used. FIG. 2 is a diagram for describing a reference technology of the person tracking technology. As illustrated in FIG. 2, the person tracking technology is a same person tracking technology in which a person detection model 50 and a person identification model 60 are combined.

The person detection model 50 detects person bounding boxes (Bboxes) indicating existence positions of persons in response to input of image data of the respective cameras, and outputs the person bounding boxes as an output result. The person identification model 60 outputs a determination result as to whether or not persons are the same person on the basis of similarity evaluation of feature amounts (feature vectors) of these persons in response to input of two person bounding boxes detected from image data of the respective cameras.

However, in actual operation, in a case where image characteristics of learning data (training data) used for machine learning (training) of the person identification model are different from image characteristics of actual image data captured by the respective cameras 2, accuracy of the person identification model 60 is reduced. Furthermore, since installation positions of the respective cameras 2 are different, an angle of view, brightness, a background, and the like of the cameras are also different. Thus, in the situation where a learning data environment and an actual operation environment do not match, the accuracy of the person identification model 60 is reduced.

For example, in a case where image characteristics do not match between learning data for person identification and an actual store to be inferred, a person feature distribution fluctuates, so that inference accuracy of a person feature amount is reduced and a person is misidentified. Due to such misidentification, it becomes difficult to track the same person by using the image data captured by the cameras 2, and it is not possible to accurately analyze purchasing behavior.

Thus, in the first embodiment, since a floor map and camera arrangement of the store 1 may be acquired, learning data for person identification of the store to be inferred is acquired by using an overlapping portion of image capturing areas of the plurality of cameras and by focusing on a characteristic that person bounding boxes at the same position appearing in the respective cameras 2 at the same time are the same person. By executing machine learning of the person identification model by using the learning data acquired in this way, influence of the image characteristics is reduced, and misidentification of a person is suppressed.

Figure 3:
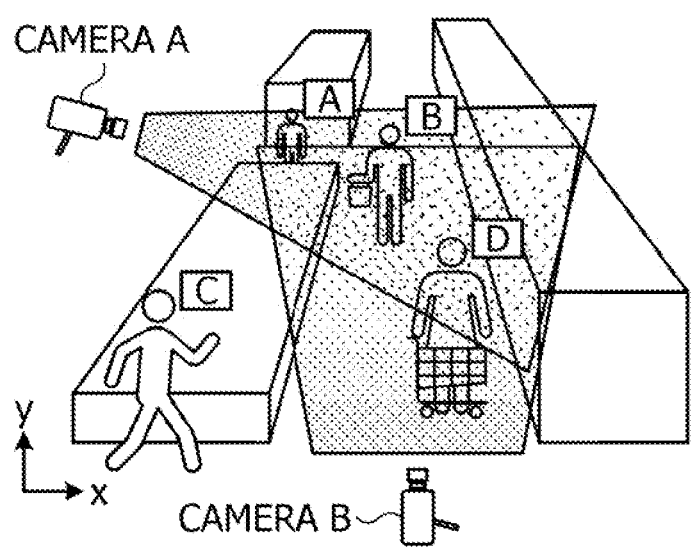
FIG. 3 is a diagram for describing generation of learning data using an actual video of a store.

FIG. 3 is a diagram for describing generation of learning data using an actual video of the store 1. As illustrated in FIG. 3, the respective cameras 2 installed in the store 1 capture images from different positions in different directions, but areas to be captured are partially common (overlapping). For example, a person A and a person B appear in image data captured by a camera A, the person A, the person B, and a person D appear in image data captured by a camera B, and the person A and the person B are captured in common by each of the cameras. Therefore, although it is not possible to specify "who is the person" for the person A and the person B, it is possible to specify that the person A and the person B are the same persons. Furthermore, the person A and the person B are captured from the different directions and are not the same image data.

For example, by using video data of the cameras 2 in the store, it is possible to collect a plurality of pieces of image data of the same person, which is captured from different directions. The information processing apparatus 10 of the first embodiment executes machine learning of the person identification model by using, as learning data, each piece of such image data of the same person captured from different directions.

Figure 4:
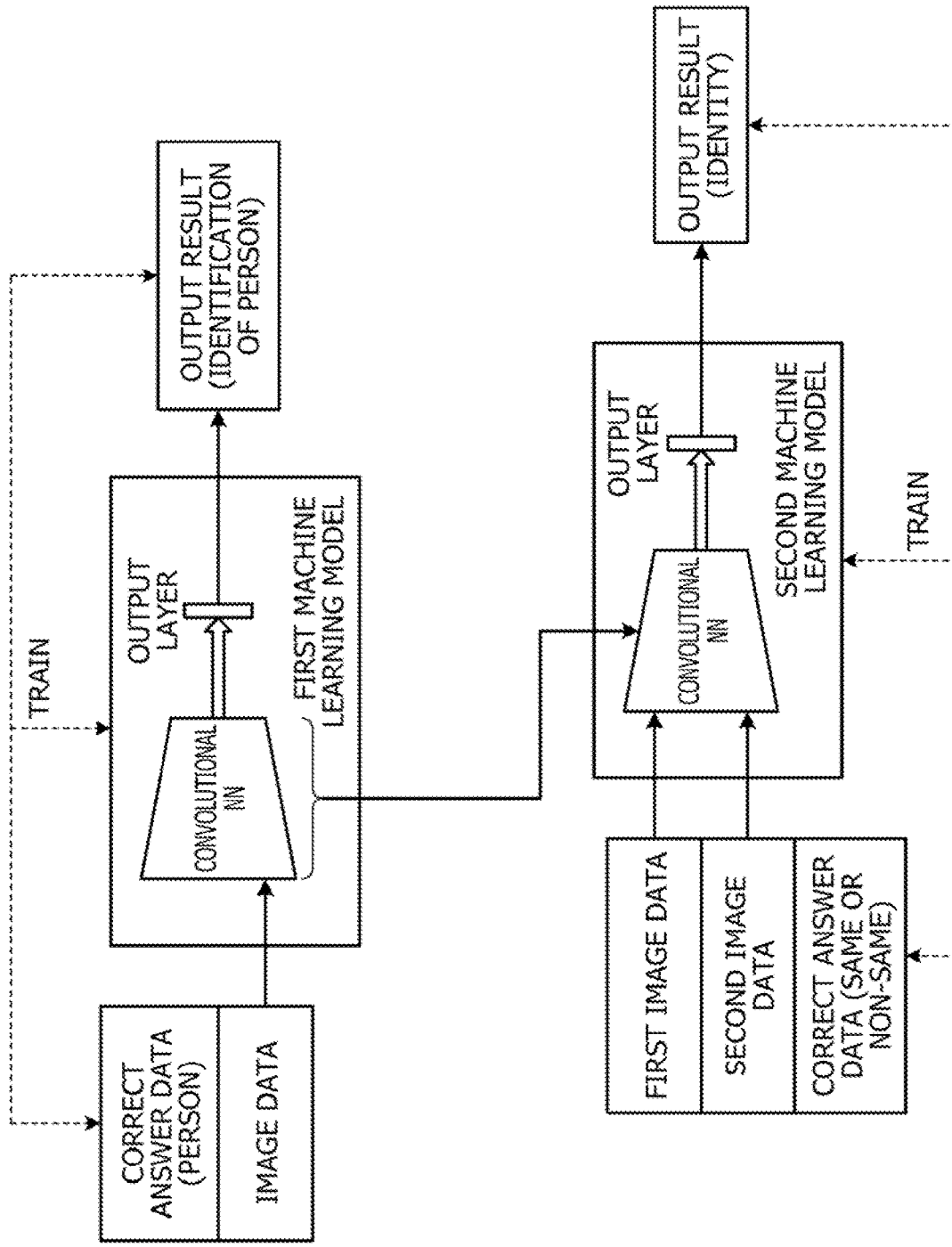
FIG. 4 is a diagram for describing generation of a person identification model used in the person tracking technology according to first embodiment.

FIG. 4 is a diagram for describing generation of the person identification model used in the person tracking technology according to the first embodiment. As illustrated in FIG. 4, the information processing apparatus 10 acquires learning data in which image data and correct answer data (person label) are associated with each other from a public data set or the like that is commonly used. Then, the information processing apparatus 10 inputs the image data to a first machine learning model including, for example, a convolutional neural network, acquires an output result, and executes training of the first machine learning model so that the output result and the correct answer data match. For example, the information processing apparatus 10 generates the first machine learning model by machine learning of a multi-class classification problem using learning data related to a plurality of persons.

Thereafter, the information processing apparatus 10 generates a second machine learning model by using an input layer and an intermediate layer of the trained first machine learning model and a new output layer. Furthermore, the information processing apparatus 10 generates learning data to which a same person label (correct answer data) is assigned by using first image data and second image data which are image data of the same person and are generated from image data of a store. Then, the information processing apparatus 10 inputs the first image data and the second image data of the learning data generated from the image data of the store to the second machine learning model, acquires an output result including a determination result of identity, and executes training of the second machine learning model so that the output result and the correct answer data match. For example, the information processing apparatus 10 generates the second machine learning model by machine learning of a two-class classification problem using learning data related to a predetermined person.

By executing person identification by using the second machine learning model generated in this way, the information processing apparatus 10 may learn a person feature amount suitable for a store to be inferred, improve person tracking accuracy, and implement purchasing behavior analysis with high accuracy.

[Functional Configuration]

Figure 5:
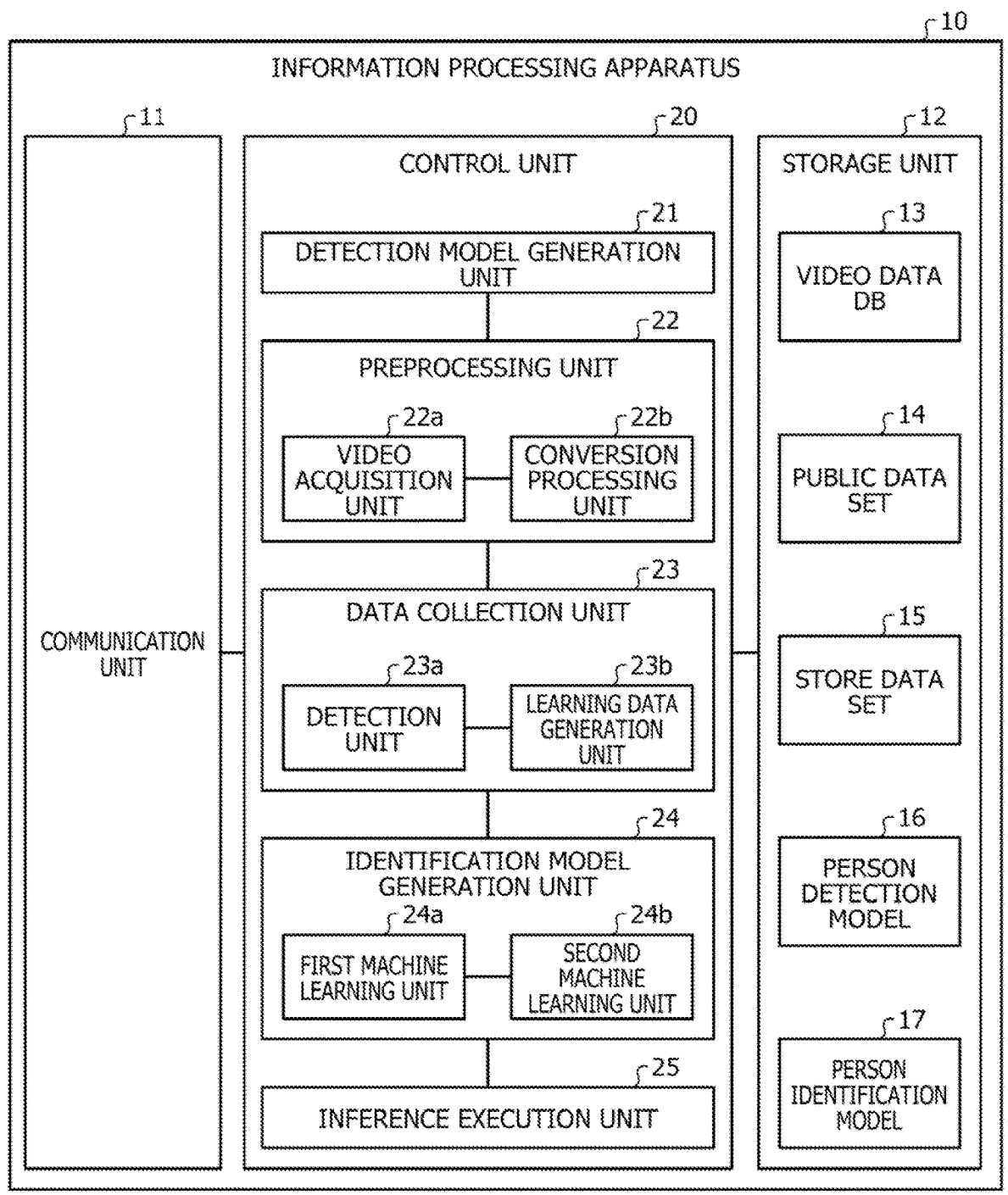
FIG. 5 is a functional block diagram illustrating a functional configuration of an information processing apparatus according to the first embodiment.

FIG. 5 is a functional block diagram illustrating a functional configuration of the information processing apparatus 10 according to the first embodiment. As illustrated in FIG. 5, the information processing apparatus 10 includes a communication unit 11, a storage unit 12, and a control unit 20.

The communication unit 11 is a processing unit that controls communication with another device, and is implemented by, for example, a communication interface. For example, the communication unit 11 receives video data from the cameras 2, and transmits a processing result by the control unit 20 to a terminal of a store clerk, or the like.

The storage unit 12 is a processing unit that stores various types of data, programs executed by the control unit 20, and the like, and is implemented by a memory, a hard disk, or the like. The storage unit 12 stores a video data database (DB) 13, a public data set 14, a store data set 15, a person detection model 16, and a person identification model 17.

The video data DB 13 is a database that stores video data captured by each of the plurality of cameras 2 installed in the store 1. For example, the video data DB 13 stores video data for each camera 2 or for each time zone in which the video data is captured.

The public data set 14 stores learning data collected in advance. For example, the public data set 14 stores learning data used for machine learning of the person detection model 16 and learning data used for machine learning of a multi-class classification problem of the person identification model 17.

For example, the learning data used for machine learning of the person detection model 16 is data in which image data in which a person appears and a person bounding box indicating an existence position of the person appearing in the image data are associated with each other. For example, the image data is an explanatory variable, and the person bounding box is an objective variable (correct answer data).

Furthermore, the learning data for a multi-class classification problem is data in which a person bounding box and a person label indicating who the person is are associated with each other. For example, the person bounding box is an explanatory variable, and the person label is an objective variable (correct answer data).

The store data set 15 stores learning data used for machine learning of a two-class classification problem of the person identification model 17. For example, the store data set 15 stores learning data generated by using video data of the cameras 2 of the store 1 by the control unit 20 described later. The learning data stored here is data in which two person bounding boxes and a same person label indicating whether or not the persons are the same person are associated with each other. For example, the two person bounding boxes are explanatory variables, and the same person label is an objective variable (correct answer data).

The person detection model 16 is a machine learning model that has an input layer, an intermediate layer, and an output layer, and detects, in response to input of image data, a person bounding box in the image data. For example, a convolutional neural network may be adopted for the person detection model 16.

The person identification model 17 is a machine learning model that has an input layer, an intermediate layer, and an output layer, and identifies, in response to input of a person bounding box, which person the person bounding box is. For example, a convolutional neural network may be adopted for the person identification model 17.

The control unit 20 is a processing unit that is in charge of the entire information processing apparatus 10, and is implemented by, for example, a processor. The control unit 20 includes a detection model generation unit 21, a preprocessing unit 22, a data collection unit 23, an identification model generation unit 24, and an inference execution unit 25. Note that the detection model generation unit 21, the preprocessing unit 22, the data collection unit 23, the identification model generation unit 24, and the inference execution unit 25 are implemented by an electronic circuit included in a processor, processes executed by the processor, and the like.

The detection model generation unit 21 is a processing unit that generates the person detection model 16 by machine learning. For example, the detection model generation unit 21 generates the person detection model 16 by executing update of various parameters such as a weight of the person detection model 16 so as to detect a person bounding box from input learning data.

Figure 6:
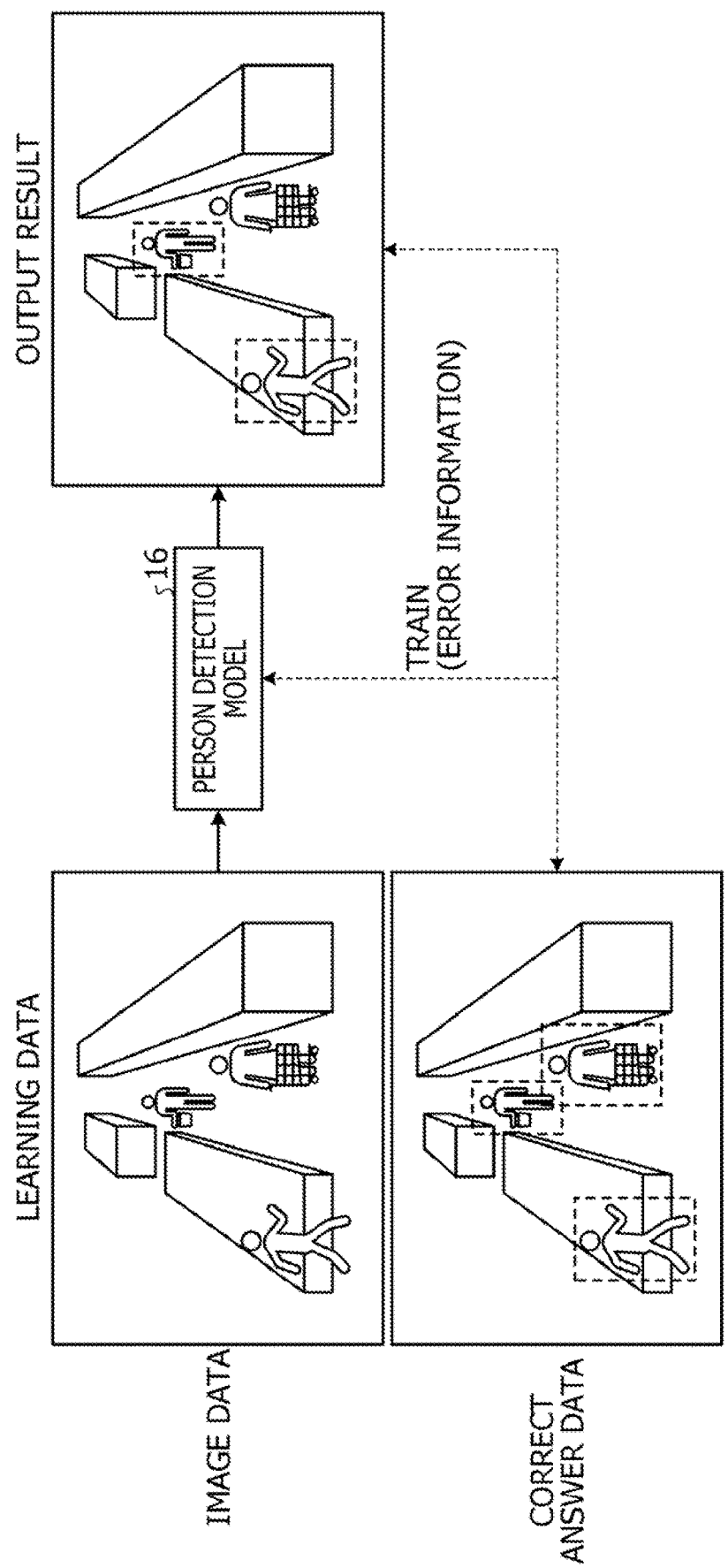
FIG. 6 is a diagram for describing generation of a person detection model.

FIG. 6 is a diagram for describing generation of the person detection model 16. As illustrated in FIG. 6, the detection model generation unit 21 acquires, from the public data set 14, learning data in which image data to be input and correct answer data in which person bounding boxes are specified are associated with each other. Then, the detection model generation unit 21 inputs the image data to the person detection model 16, and acquires an output result of the person detection model 16. Thereafter, the detection model generation unit 21 executes machine learning of the person detection model 16 by error back propagation or the like so that an error between the output result and the correct answer data becomes small.

The preprocessing unit 22 is a processing unit that includes a video acquisition unit 22a and a conversion processing unit 22b and executes preprocessing for generating learning data for a two-class classification problem from image data captured in the store 1. For example, the preprocessing unit 22 estimates a projection conversion coefficient of an image capturing area of each camera 2 with respect to the floor map of the store 1 to be inferred.

The video acquisition unit 22a is a processing unit that acquires video data from each camera 2, and stores the video data in the video data DB 13. For example, the video acquisition unit 22a may acquire the video data from each camera 2 at any time or periodically.

The conversion processing unit 22b is a processing unit that estimates a projection conversion coefficient for converting image coordinates, which are coordinates of image data captured by each camera 2 and are different for each camera 2, into floor map coordinates, which are coordinates of the floor map of the store 1 and are common to each camera. Note that, since the cameras and the floor configuration are usually fixed, it is sufficient that the estimation of the projection conversion (homography) coefficient is performed once.

Figure 7:
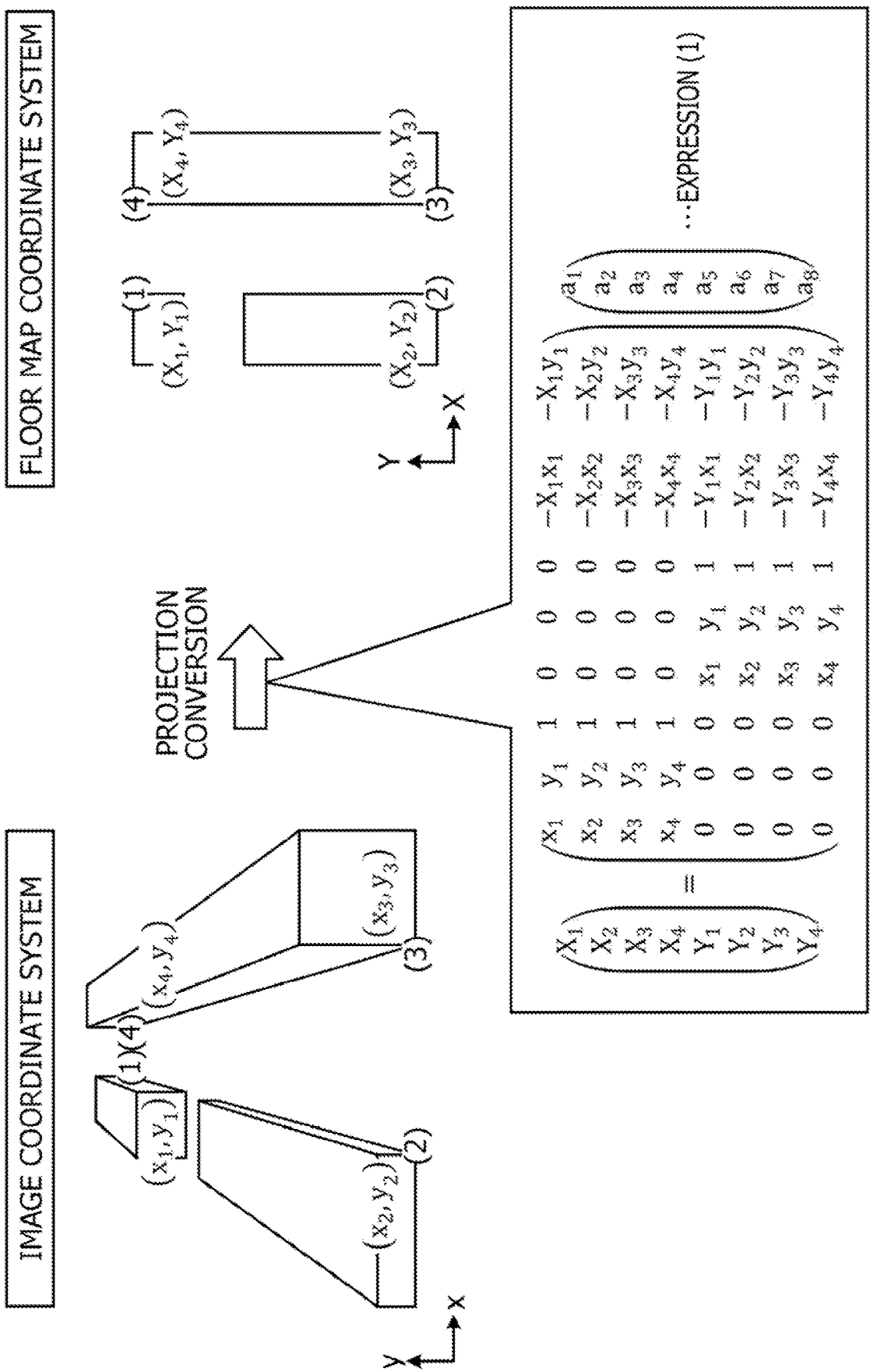
FIG. 7 is a diagram for describing calculation of a projection conversion coefficient.

FIG. 7 is a diagram for describing calculation of the projection conversion coefficient. As illustrated in FIG. 7, the conversion processing unit 22b specifies an optional point (corresponding point) corresponding between a camera image (image coordinate system) and the floor map (floor map coordinate system). For example, the conversion processing unit 22b specifies a point $(x_1, y_1)$, a point $(x_2, y_2)$, a point $(x_3, y_3)$, and a point $(x_4, y_4)$ from the image coordinate system. Similarly, the conversion processing unit 22b specifies a point $(X_1, Y_1)$, a point $(X_2, Y_2)$, a point $(X_3, Y_3)$, and a point $(X_4, Y_4)$ from the floor map coordinate system. Thereafter, the conversion processing unit 22b calculates a projection conversion coefficient $a_i$ (i=1 to 8) from the image coordinate system (x, y) to the floor map coordinate system (X, Y) by solving simultaneous equations indicated in Expression (1) of FIG. 7. Note that the corresponding point may be specified by a user, or a point at the same location may be specified by image analysis.

The data collection unit 23 is a processing unit that includes a detection unit 23a and a learning data generation unit 23b and executes person detection and coordinate calculation to generate learning data for a two-class classification problem from image data of the cameras 2.

Figure 8:
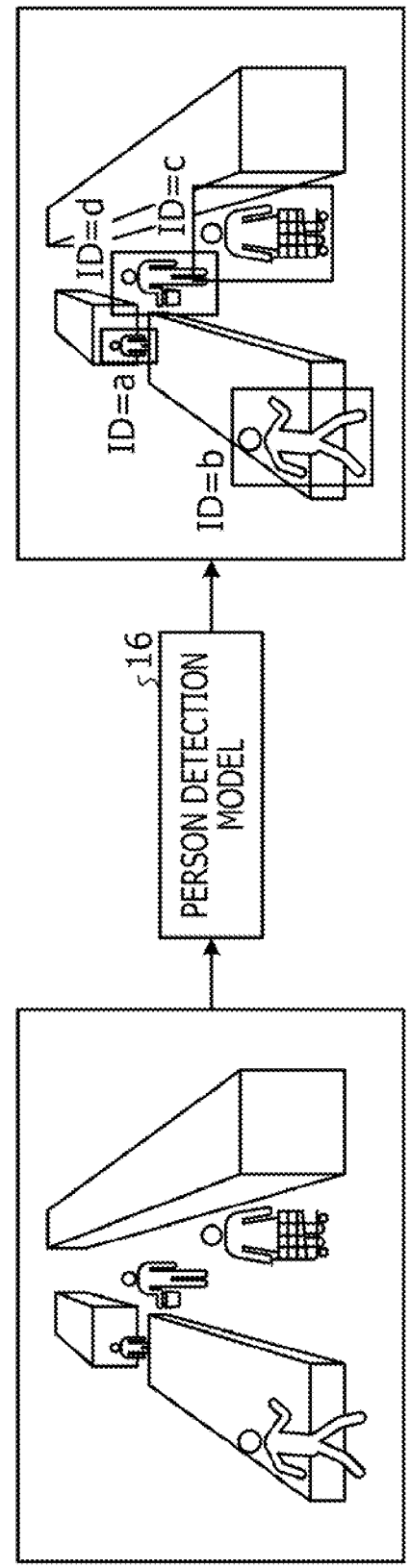
FIG. 8 is a diagram for describing detection of a person bounding box.

The detection unit 23a is a processing unit that detects a person bounding box from image data captured by each camera 2 by using the trained person detection model 16. FIG. 8 is a diagram for describing detection of the person bounding box. As illustrated in FIG. 8, the detection unit 23a inputs image data captured by the camera 2 to the person detection model 16, and acquires an output result in which a person bounding box with identification (ID)=a, a person bounding box with ID=b, a person bounding box with ID=c, and a person bounding box with ID=d are detected.

In this way, the detection unit 23a performs person detection for various types of image data captured from different directions by the respective cameras 2 installed at different positions, acquires an output result including detected person bounding boxes, and store the output result in the storage unit 12 and the like.

The learning data generation unit 23b is a processing unit that calculates floor map coordinates of a person bounding box detected by the detection unit 23a, extracts a pair image of the same person, and generates learning data for a two-class classification problem.

Figure 9:
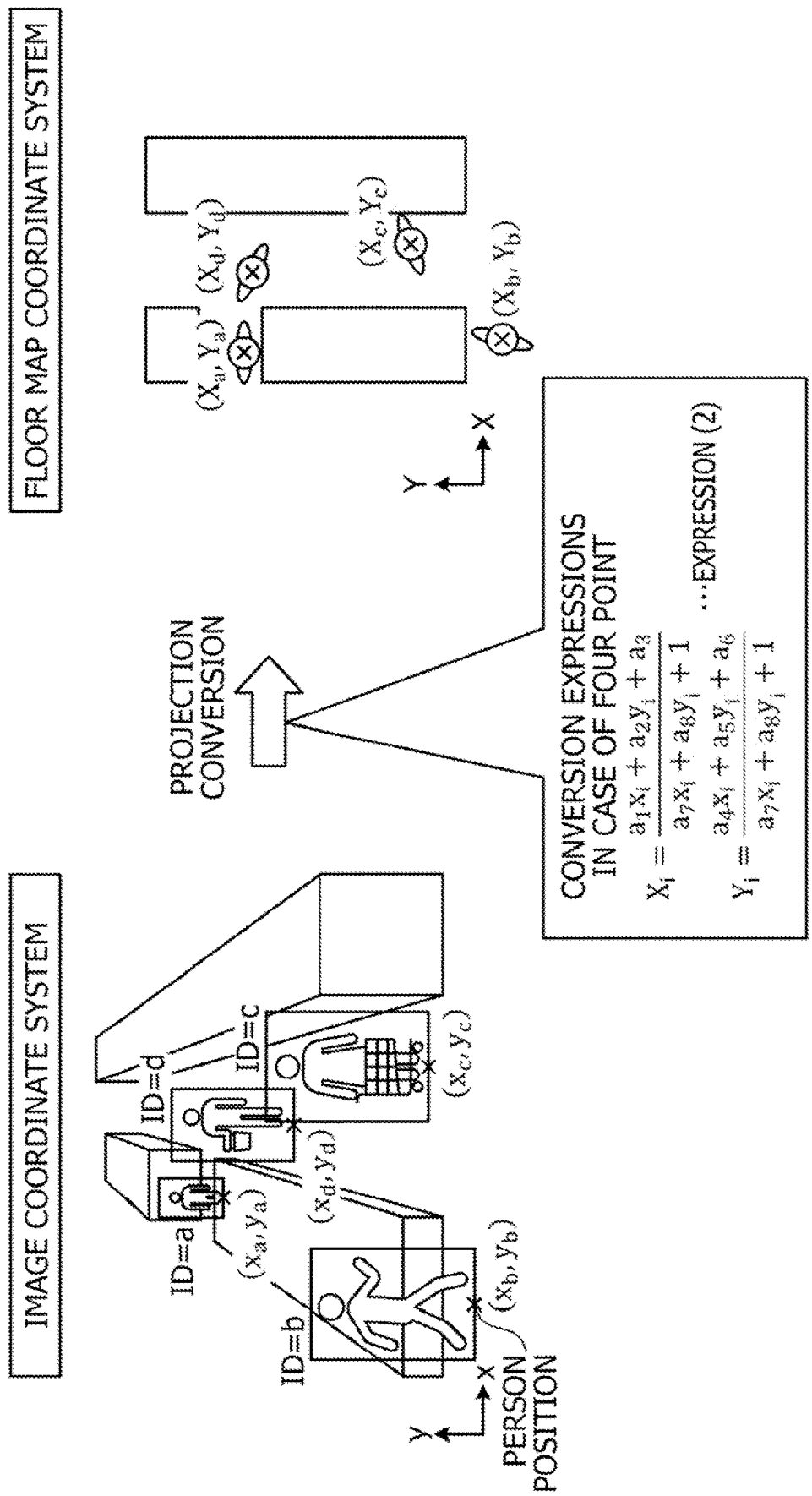
FIG. 9 is a diagram for describing coordinate conversion.

First, the learning data generation unit 23b converts a person bounding box of an image coordinate system detected by the detection unit 23a into a floor map coordinate system by using a projection conversion coefficient calculated by the preprocessing unit 22. FIG. 9 is a diagram for describing coordinate conversion. As illustrated in FIG. 9, the learning data generation unit 23b calculates a person position in floor map coordinates (X, Y) with image coordinates (x, y) at the center of the lower end of each person bounding box as the person position.

For example, the learning data generation unit 23b converts, by using conversion expressions indicated in Expression (2) of FIG. 9, the point $(x_1, y_1)$, the point $(x_2, y_2)$, the point $(x_3, y_3)$, and the point $(x_4, y_4)$ indicating person positions detected in the image coordinate system into the point $(X_1, Y_1)$, the point $(X_2, Y_2)$, the point $(X_3, Y_3)$, and the point $(X_4, Y_4)$ indicating the person positions in the floor map coordinate system, respectively. In this way, the learning data generation unit 23b expresses the person bounding box of the image coordinate system specific to the camera, which appears in image data of each camera 2, in the floor map coordinate system common to each camera.

Next, the learning data generation unit 23b acquires a data set of a pair of person bounding box images positioned at equivalent floor map coordinates between two cameras. For example, the learning data generation unit 23b extracts a pair of (paired) person bounding boxes that are the same person by using person bounding boxes in a plurality of pieces of image data captured at the same time among pieces of image data of the respective cameras 2.

Figure 10:
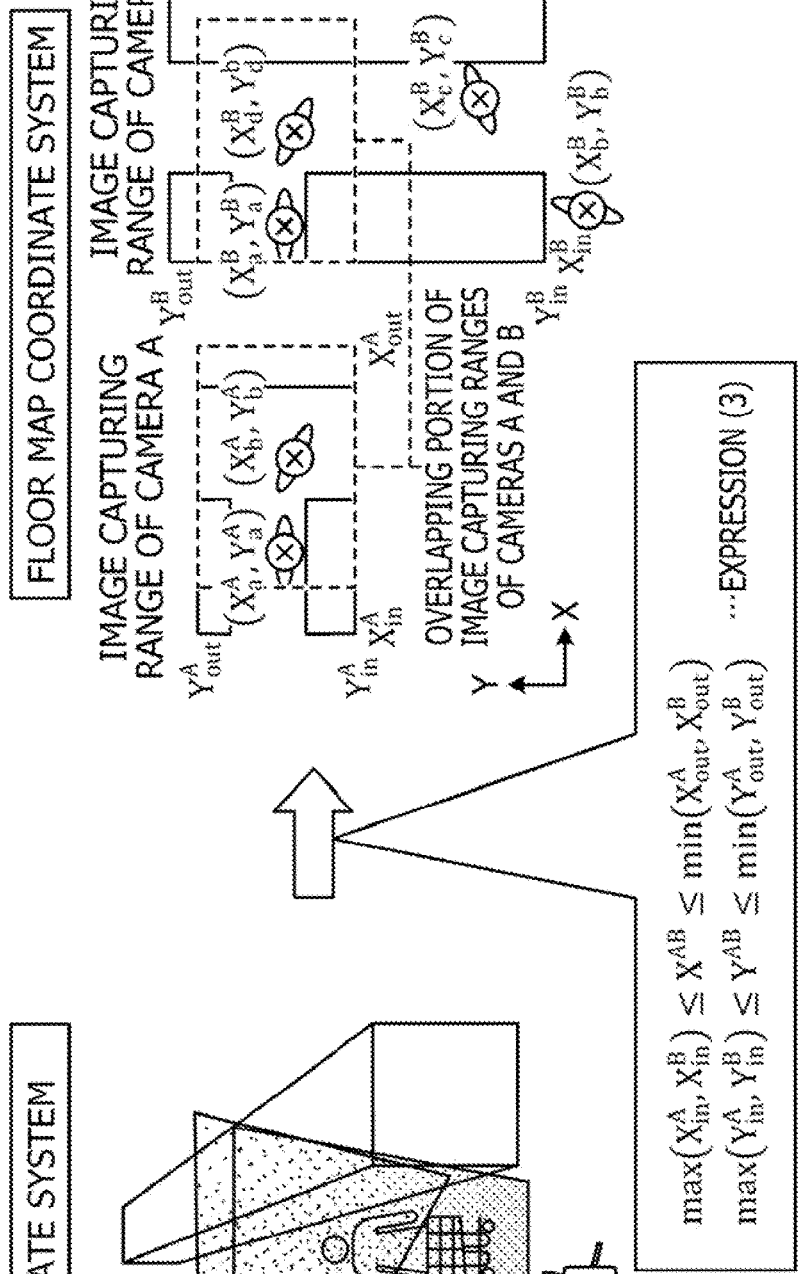
FIG. 10 is a diagram for describing extraction of a same person pair.

FIG. 10 is a diagram for describing extraction of a same person pair. As illustrated in FIG. 10, the learning data generation unit 23b acquires image data A captured by the camera A at a time t and image data B captured by the camera B at the same time t. Then, by using Expression (2) of FIG. 9, the learning data generation unit 23b converts person bounding boxes of the image coordinate system detected from the image data A of the camera A into person bounding boxes of the floor map coordinate system. Similarly, by using Expression (2) of FIG. 9, the learning data generation unit 23b converts person bounding boxes of the image coordinate system detected from the image data B of the camera B into person bounding boxes of the floor map coordinate system.

Then, the learning data generation unit 23b calculates a range of the floor map coordinates where image capturing ranges of the respective cameras overlap. For example, as illustrated in FIG. 10, an image capturing range of the camera A is a range of $X^A_{in}$ or $X^A_{out}$ on an X-axis and a range of $Y^A_{in}$ or $Y^A_{out}$ on a Y-axis, and within the range, $(X^A_a, Y^A_a)$ and $(X^A_b, Y^A_b)$ are detected as person positions. Furthermore, an image capturing range of the camera B is a range of $X^B_{in}$ or $X^B_{out}$ on the X-axis and a range of $Y^B_{in}$ or $Y^B_{out}$ on the Y-axis, and within the range, $(X^B_a, Y^B_a)$, $(X^B_b, (X^B_c, Y^B_c)$, and $(X^B_d, Y^B_d)$ are detected as person positions. Note that, as described above, the respective person positions are image coordinates at the center of the lower end of the detected person bounding boxes.

Here, the learning data generation unit 23b calculates a range ($X^{AB}$, $Y^{AB}$) where the range of the floor map coordinates ($X^A$, $Y^A$) of the camera A and the range of the floor map coordinates ($X^B$, $Y^B$) of the camera B overlap. Note that, as indicated in Expression (3) of FIG. 10, the range of $X^{AB}$ is equal to or greater than a maximum value of "$X^A_{in}$ or $X^B_{in}$" and equal to or smaller than a minimum value of "$X^A_{out}$ or $X^B_{out}$", and the range of $Y^{AB}$ is equal to or greater than a maximum value of "$Y^A_{in}$ or $Y^B_{in}$" and equal to or smaller than a minimum value of "$Y^A_{out}$ or $Y^B_{out}$".

Subsequently, the learning data generation unit 23b extracts a person pair at an equivalent position for a person group of each camera in the overlapping range ($X^{AB}$, $Y_{AB}$). For example, by using a method such as minimum weighted matching based on a Euclidean distance, the learning data generation unit 23b extracts a combination of neighboring pairs, and sets a pair whose Euclidean distance is smaller than a predetermined threshold among the neighboring pairs as a same person pair. At this time, since the learning data generation unit 23b acquires a large amount of almost the same pair data when performing the extraction for each frame, thinning out may be performed by sampling.

In the example of FIG. 10, the learning data generation unit 23b specifies that a person Aa ($X^A_a$, $Y^A_a$) and a person Ab ($X^A_b$, $Y^A_b$) are detected in the image capturing range on the side of the camera A, and a person Ba ($X^B_a$, $Y^B_a$) and a person Bd ($X^B_d$, $Y^B_d$) are detected in the image capturing range on the side of the camera B, in the overlapping range of the camera A and the camera B. Subsequently, the learning data generation unit 23b calculates a Euclidean distance between the person Aa ($X^A_a$, $Y^A_a$) and the person Ba ($X^B_a$, $Y^B_a$) and a Euclidean distance between the person Aa ($X^A_a$, $Y^A_a$) and the person Bd ($X^B_d$, $Y^B_d$). Similarly, the learning data generation unit 23b calculates a Euclidean distance between the person Ab ($X^A_b$, $Y^A$O and the person Ba ($X^B_a$, $Y^B_a$) and a Euclidean distance between the person Ab ($X^A_b$, $Y^A_b$) and the person Bd ($X^B_d$, $Y^B_d$).

Thereafter, the learning data generation unit 23b extracts, as a person pair whose Euclidean distance is smaller than a predetermined threshold, each of a pair of the person Aa ($X^A_a$, $Y^A_a$) and the person Ba ($X^B_a$, $Y^B_a$) and a pair of the person Ab ($X^A_b$, $Y^A_b$) and the person Bd ($X^B_d$, $Y^B_d$).

In this way, the learning data generation unit 23b extracts the pairs that are the same person for persons (person bounding boxes) included in image data of the respective cameras captured at the same time, and generates learning data for a two-class classification problem.

Figure 11:
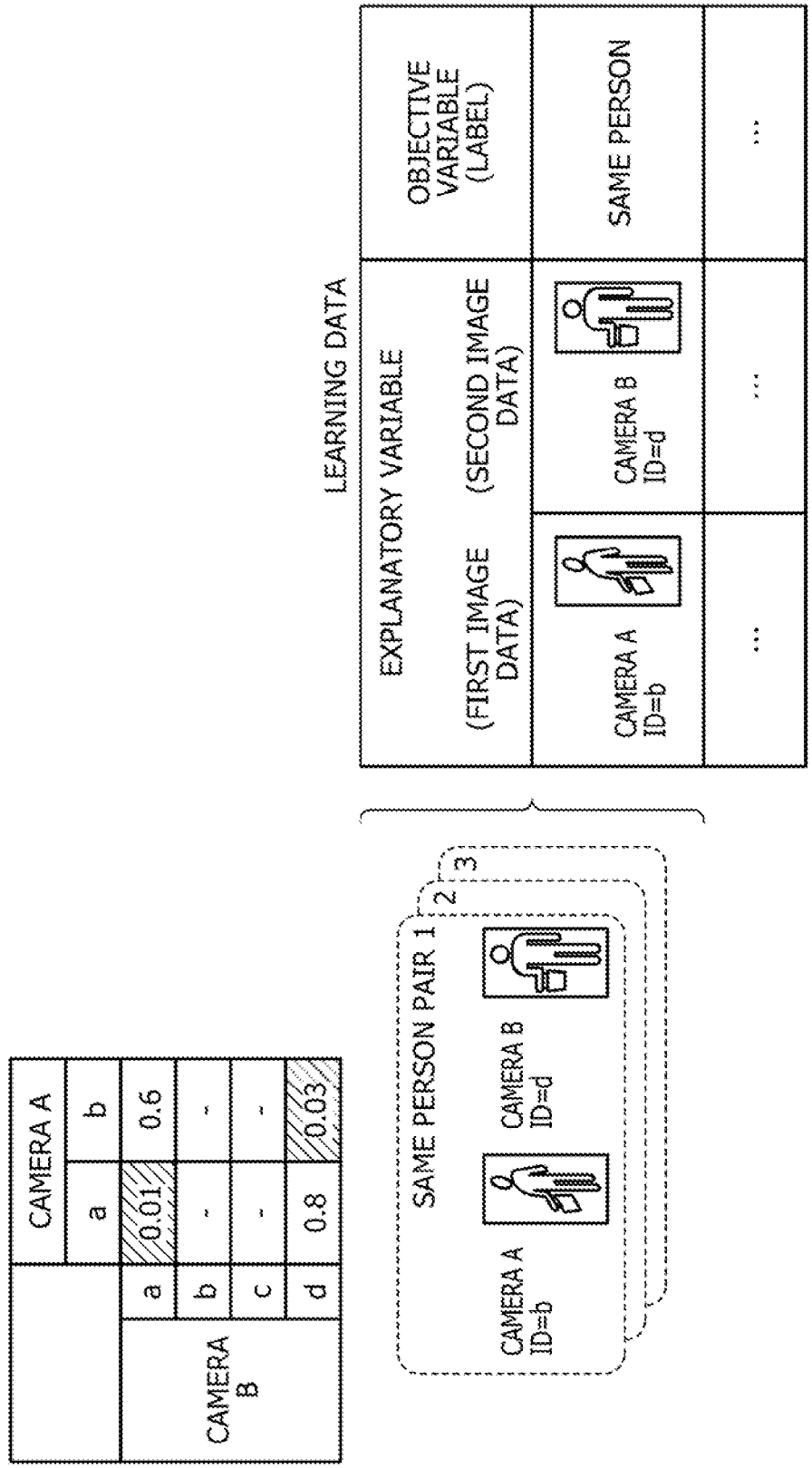
FIG. 11 is a diagram for describing generation of learning data.

FIG. 11 is a diagram for describing generation of the learning data. As illustrated in FIG. 11, the learning data generation unit 23b generates learning data with the respective person bounding boxes corresponding to the respective person positions extracted as a same person pair as explanatory variables and a label (same person=0 or non-same person=1) indicating that the respective person bounding boxes are the same person as an objective variable, and stores the learning data in the store data set 15.

In the example of FIG. 11, the learning data generation unit 23b generates learning data with the first image data which is the person bounding box of the person Aa ($X^A_a$, $Y^A_a$) captured by the camera A and the second image data which is the person bounding box of the person Ba ($X^B_a$, $Y^B_a$) captured by the camera B as explanatory variables, and a same person label (same person=0) indicating that the person Aa and the person Ba are the same person as an objective variable.

For example, the learning data generation unit 23b adopts person bounding boxes of the same person captured at the same time from different directions in the store 1 to be inferred as learning data for a two-class classification problem. Correct answer information (label) of the learning data generated here is not a person label indicating each person such as which person, but a same person label indicating whether or not persons are the same person. Note that, even when a pair is determined to be a non-same person, when an error between the predetermined threshold and a Euclidean distance is equal to or smaller than a second threshold and the pair is determined to be similar to some extent, the pair may be learning data to which a non-same person label is added. With this configuration, it is possible to cause a pair of confusing person bounding boxes with a small error to be learned that they are not the same person.

Returning to FIG. 5, the identification model generation unit 24 is a processing unit that includes a first machine learning unit 24a and a second machine learning unit 24b, and executes machine learning of the person identification model 17. For example, the identification model generation unit 24 executes machine learning of the person identification model 17 by using a multi-class classification problem and a two-class classification problem in combination.

Figure 12:
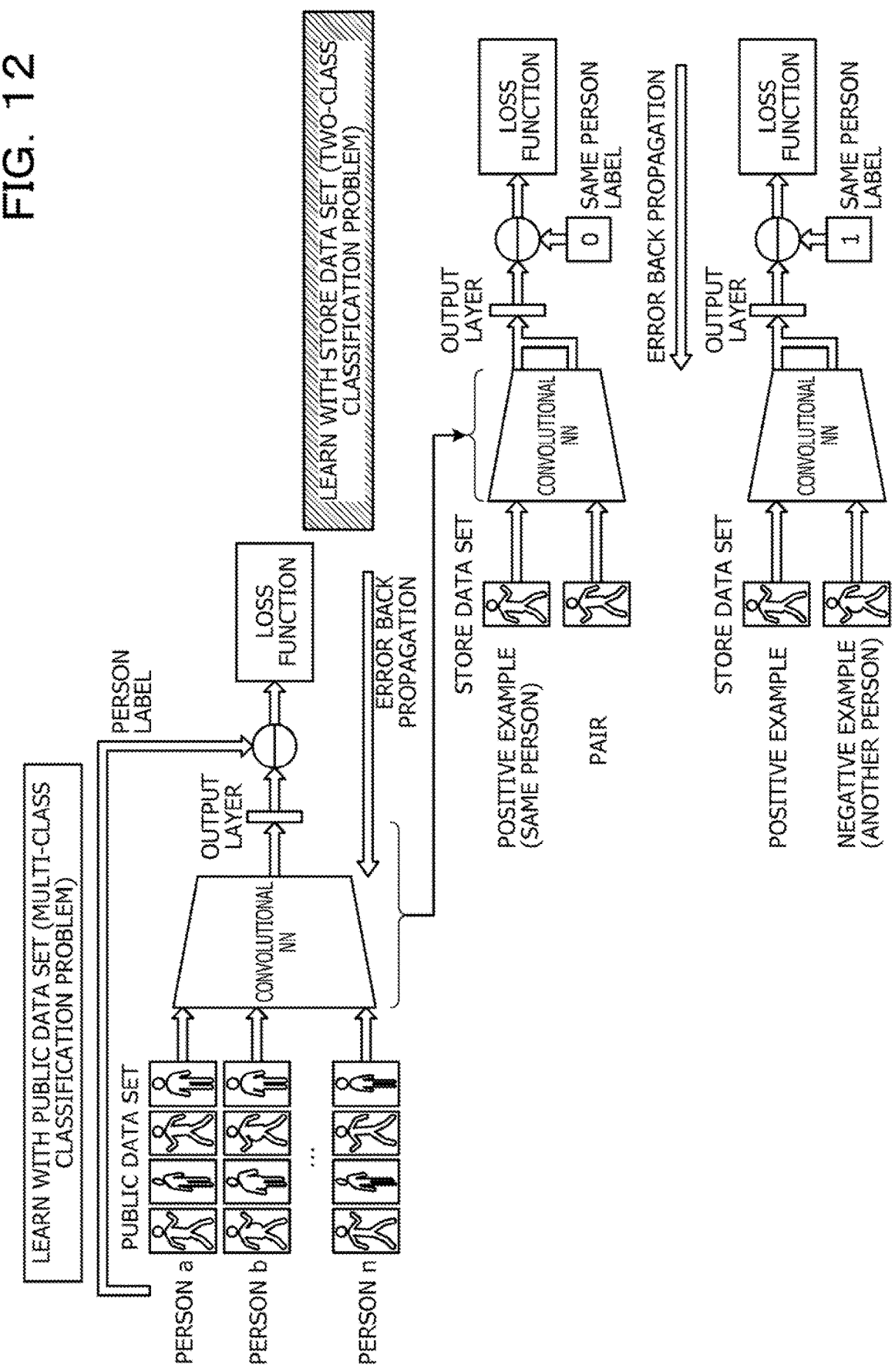
FIG. 12 is a diagram for describing generation of the person identification model.

The first machine learning unit 24a executes machine learning by the multi-class classification problem using the public data set 14 and generates a first machine learning model. FIG. 12 is a diagram for describing generation of the person identification model 17. As illustrated in FIG. 12, the first machine learning unit 24a generates the first machine learning model by machine learning of the multi-class classification problem that identifies, in response to input of each piece of learning data in which the same person appears differently, a person appearing in each piece of the input learning data. Note that the first machine learning model includes a convolutional neural network including an input layer and an intermediate layer, and an output layer.

For example, the first machine learning unit 24a inputs various person bounding boxes of the person A included in the public data set 14 to the convolutional neural network, and acquires each identification result (output result) from the output layer. Then, the first machine learning unit 24a executes update of parameters of the convolutional neural network and the output layer so that an error between each identification result and a person label (person A) becomes small, for example, each identification result is identified as the person A.

Similarly, the first machine learning unit 24a inputs various person bounding boxes of the person B included in the public data set 14 to the convolutional neural network, and acquires each identification result from the output layer. Then, the first machine learning unit 24a executes update of parameters of the convolutional neural network and the output layer so that an error between each identification result and a person label (person B) becomes small.

When machine learning using the public data set is completed, the second machine learning unit 24b generates the person identification model 17, which is one example of a second machine learning model, by executing machine learning by the two-class classification problem using the store data set 15.

For example, the second machine learning unit 24b configures the person identification model 17 by using the convolutional neural network including the input layer and the intermediate layer of the trained first machine learning model, and an untrained new output layer. Then, by using learning data stored in the store data set, the second machine learning unit 24b generates the person identification model 17 by machine learning that identifies a binary label in which the same person is 0 and another person is 1.

For example, as illustrated in FIG. 12, the second machine learning unit 24b inputs each person bounding box of a pair extracted as a positive example (same person) to the convolutional neural network, and acquires an identification result (output result) from the output layer. Then, the second machine learning unit 24b executes update of parameters of the convolutional neural network and the output layer so that an error between each identification result and a same person label (same person=0) becomes small, for example, each identification result is identified as the same person.

Furthermore, the second machine learning unit 24b inputs, as a pair, one person bounding box included in the pair extracted as the positive example (same person) and a person bounding box of another person extracted randomly to the convolutional neural network, and acquires an identification result from the output layer. Then, the second machine learning unit 24b executes update of the parameters of the convolutional neural network and the output layer so that an error between each identification result and a same person label (non-same person=1) becomes small, for example, each identification result is identified as a non-same person.

In this way, the identification model generation unit 24 generates the first machine learning model that performs multi-class classification, and generates the person identification model 17 that performs two-class classification and uses the convolutional neural network of the first machine learning model.

Returning to FIG. 5, the inference execution unit 25 is a processing unit that executes identification of a person appearing in each piece of image data captured by the cameras 2 in the actual store by using the person identification model 17 generated by the identification model generation unit 24. For example, the inference execution unit 25 executes association of persons in the image data captured by the respective cameras 2 by using the person identification model 17.

Figure 13:
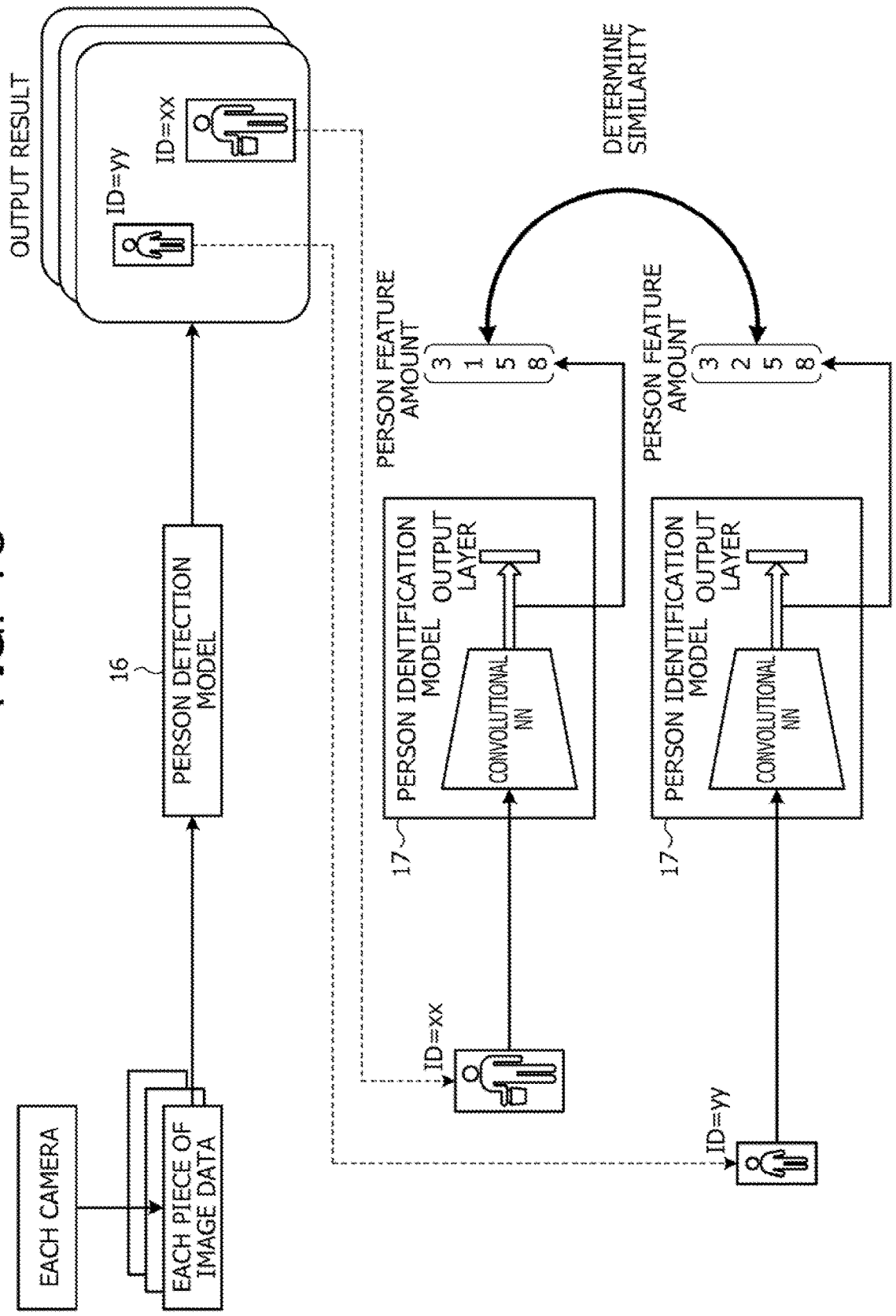
FIG. 13 is a diagram for describing inference processing.

FIG. 13 is a diagram for describing inference processing. As illustrated in FIG. 13, the inference execution unit 25 inputs each piece of image data captured by each camera 2 of the store to the trained person detection model 16, and acquires an output result including a detected person bounding box. For example, the inference execution unit 25 acquires a person bounding box with "ID=xx" and a person bounding box with "ID=yy", which are included in different output results.

Then, the inference execution unit 25 inputs the person bounding box with "ID=xx" to the person identification model 17, and acquires a person feature amount from a layer immediately before the output layer of the person identification model 17. Similarly, the inference execution unit 25 inputs the person bounding box with "ID=yy" to the person identification model 17, and acquires a person feature amount from the layer immediately before the output layer of the person identification model 17.

Thereafter, the inference execution unit 25 calculates similarity between the feature amounts, and in a case where the similarity is high, infers that the person bounding box with "ID=xx" and the person bounding box with "ID=yy" are the same person. On the other hand, in a case where the similarity between the feature amounts is low, the inference execution unit 25 infers that the person bounding box with "ID=xx" and the person bounding box with "ID=yy" are non-same persons.

For example, the inference execution unit 25 calculates a Euclidean distance and cosine similarity between the feature amounts, a square error between elements of the feature amounts, and the like as the similarity between the feature amounts, and in a case where the calculated similarity is equal to or greater than a threshold, infers that the person bounding box with "ID=xx" and the person bounding box with "ID=yy" are the same person.

Tracking the respective person bounding boxes inferred as the same person in this way may be used for behavior analysis and purchased product analysis of the person in the store.

[Flow of Processing]

Next, processing executed by each processing unit described above will be described. Here, preprocessing, data collection processing, machine learning processing, and inference processing will be described.

(Preprocessing)

Figure 14:
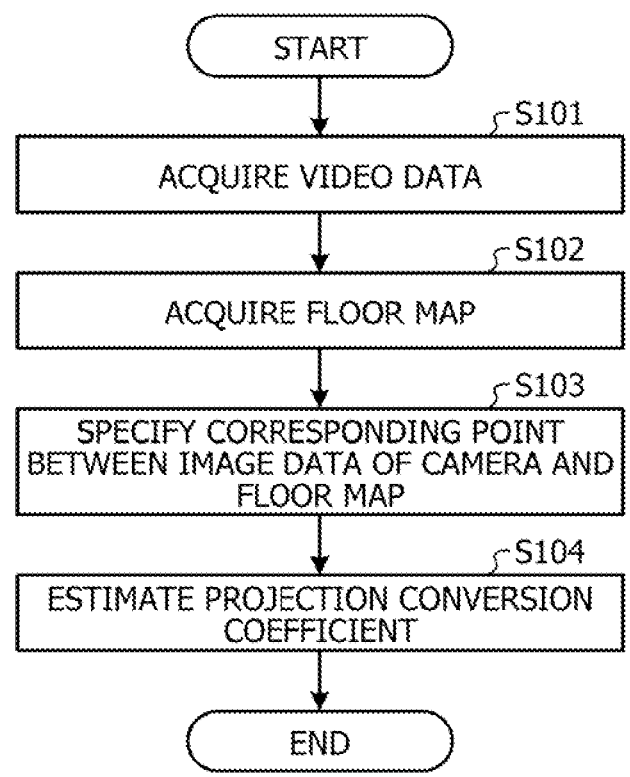
FIG. 14 is a flowchart illustrating a flow of preprocessing.

FIG. 14 is a flowchart illustrating a flow of the preprocessing. As illustrated in FIG. 14, the preprocessing unit 22 acquires video data of each camera 2 (S101), and acquires a floor map of a store designed in advance (S102).

Then, the preprocessing unit 22 specifies a corresponding point, which is a corresponding optional point, in image data of the camera 2 and the floor map (S103), and estimates a projection conversion coefficient by using Expression (1) of FIG. 7 (S104).

(Data Collection Processing)

Figure 15:
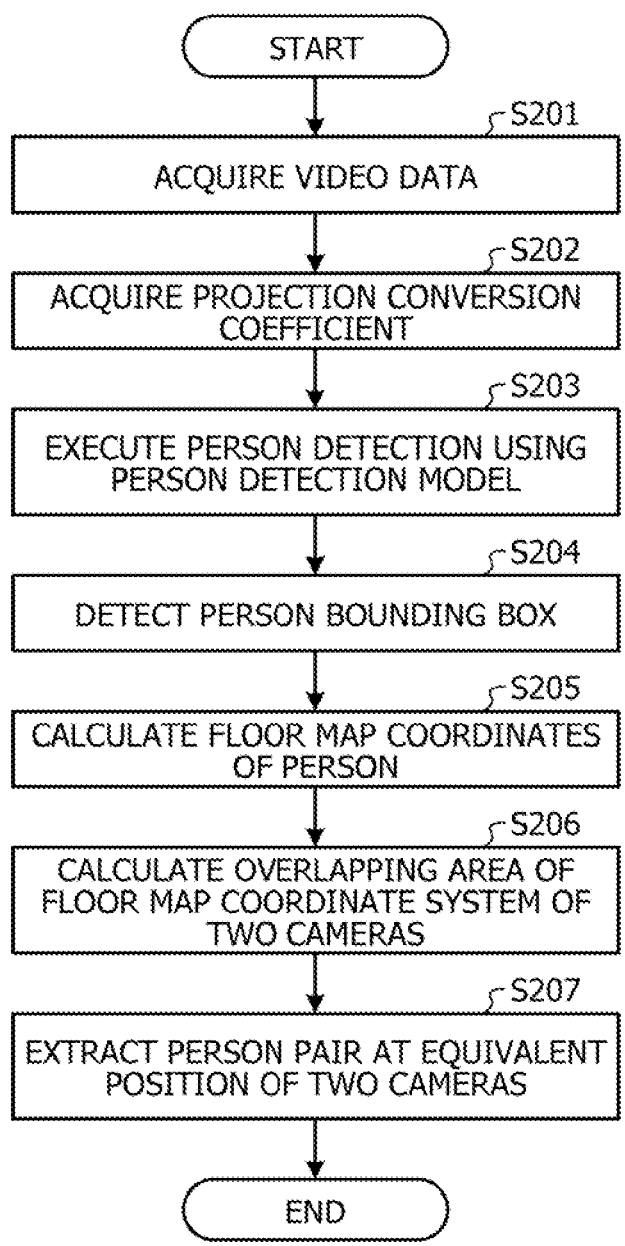
FIG. 15 is a flowchart illustrating a flow of data collection processing.

FIG. 15 is a flowchart illustrating a flow of the data collection processing. As illustrated in FIG. 15, the data collection unit 23 acquires video data of each camera 2 from the video data DB 13 (S201), and acquires a projection conversion coefficient estimated by the preprocessing unit 22 (S202).

Subsequently, the data collection unit 23 executes person detection in which each piece of image data in the video data of each camera 2 is input to the person detection model 16 (S203), and detects a person bounding box (S204).

Then, the data collection unit 23 calculates floor map coordinates of the person bounding box of each person by using the projection conversion coefficient (S205). For example, the data collection unit 23 converts an image coordinate system of the person bounding box of each person into the floor map coordinates.

Thereafter, the data collection unit 23 calculates an overlapping area of a floor map coordinate system for image data of two cameras (S206). Then, the data collection unit 23 extracts a person pair at an equivalent position in pieces of the image data at the same time captured by the two cameras (S207). Note that the extracted person pair and a same person label are generated as learning data.

(Machine Learning Processing)

Figure 16:
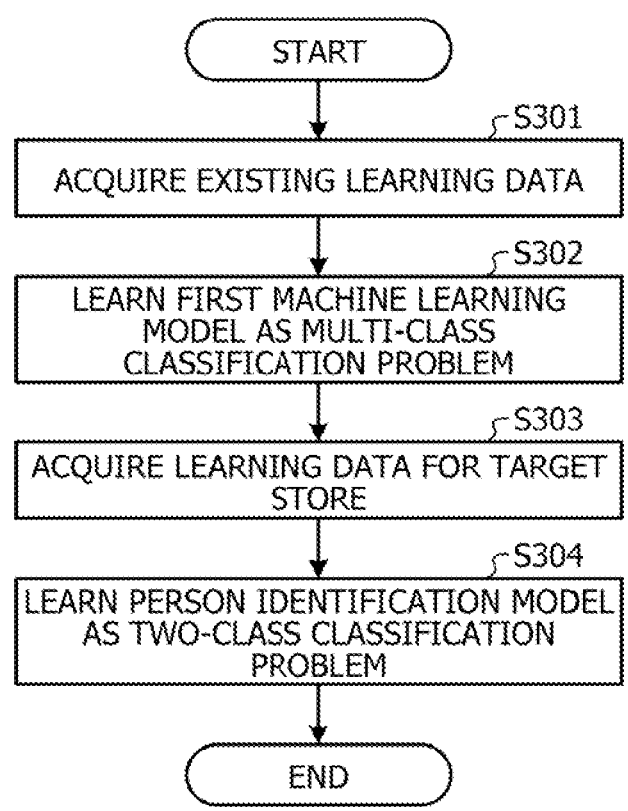
FIG. 16 is a flowchart illustrating a flow of machine learning processing of the person identification model.

FIG. 16 is a flowchart illustrating a flow of the machine learning processing of the person identification model. As illustrated in FIG. 16, the identification model generation unit 24 acquires existing learning data stored in advance in the public data set 14 (S301), and executes, by using the existing learning data, machine learning of the first machine learning model as a multi-class classification problem (S302).

Subsequently, the identification model generation unit 24 acquires learning data for a target store, which is generated by using image data of the store and stored in the store data set 15 (S303), and executes, by using the learning data for the target store, machine learning of the person identification model 17 as a two-class classification problem (S304).

(Inference Processing)

Figure 17:
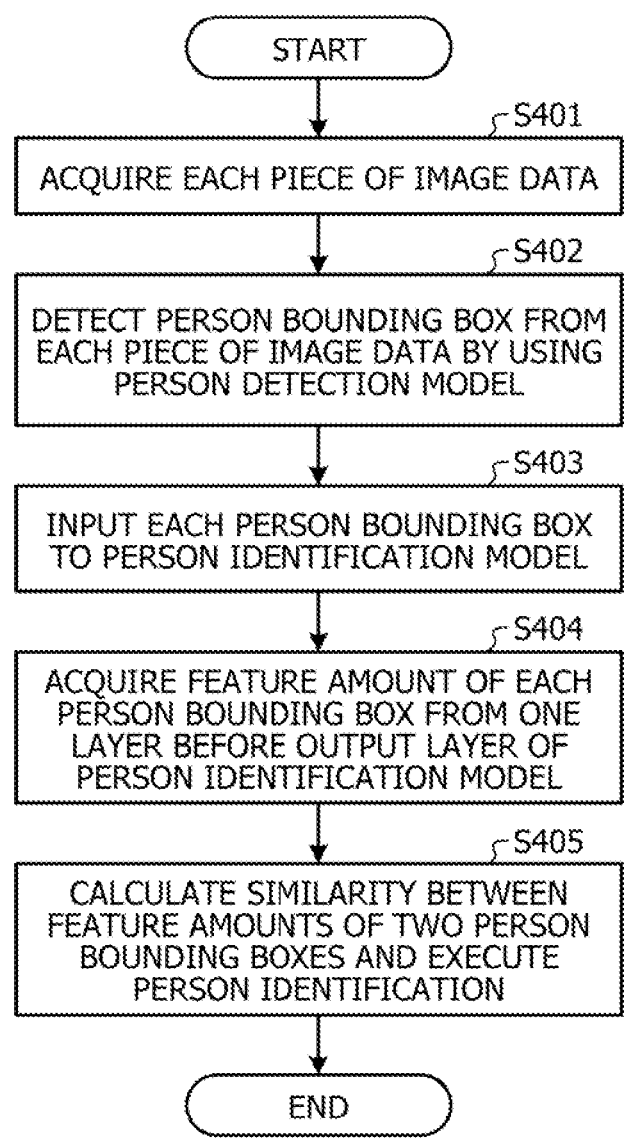
FIG. 17 is a flowchart illustrating a flow of the inference processing.

FIG. 17 is a flowchart illustrating a flow of the inference processing. As illustrated in FIG. 17, the inference execution unit 25 acquires each piece of image data of each camera 2 (S401), inputs each piece of image data to the person detection model 16, and detects a person bounding box (S402).

Then, the inference execution unit 25 inputs two person bounding boxes to the person identification model 17 (S403), and acquires a feature amount of each person bounding box from a layer immediately before (one layer before) the output layer of the person identification model 17 (S404). Thereafter, the inference execution unit 25 calculates similarity between the feature amounts of the person bounding boxes, and executes person identification (S405).

[Effects]

As described above, the information processing apparatus 10 may acquire learning data for person identification for a store to be inferred by focusing on a characteristic that person bounding boxes at the same position appearing in the respective cameras 2 at the same time are the same person. Here, the information processing apparatus 10 does not have a person label in the learning data obtained in the first embodiment, and performs learning by using insufficient label information (same person label) that may not be used in the reference technology. Therefore, the information processing apparatus 10 may automatically acquire the learning data to be analyzed, and may continuously improve accuracy of the person identification.

Furthermore, although a two-class classification problem has a smaller amount of label information than a multi-class classification problem, in the method according to the first embodiment, it is possible to automatically acquire a large amount of same person pair data that contributes to improvement of accuracy by using an overlapping area of the cameras 2. Therefore, the information processing apparatus 10 may solve limitation on the amount of the label information by the amount of the data.

Figure 18:
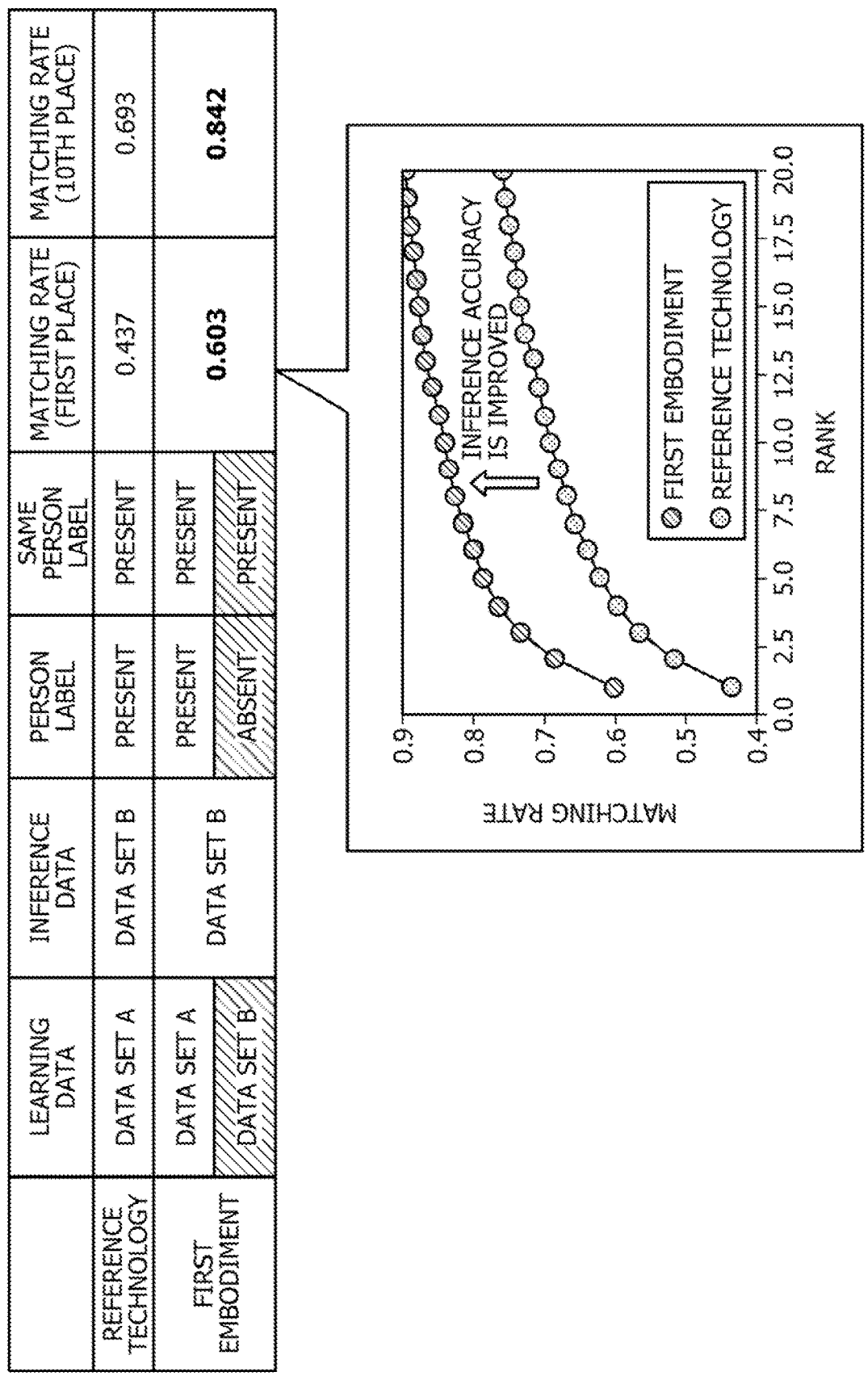
FIG. 18 is a diagram for describing an effect of the first embodiment.

FIG. 18 is a diagram for describing an effect of the first embodiment. FIG. 18 illustrates comparison of inference accuracy of person identification of the reference technology and the technology (proposed technology) according to the first embodiment. Here, a data set A and a data set B with different person image characteristics (season, background, and the like) are prepared, and learning is performed with the data set A and inference is performed with the data set B. Note that, in the method according to the first embodiment, the data set B is also used for learning (however, only a same person label).

As illustrated in FIG. 18, when comparison is made with inference accuracy by a cumulative collation characteristic, which is a ratio of identification as the same person within a specific rank in a large amount of person data, in the case of the reference technology, sufficient inference accuracy is obtained for the same data set, but sufficient inference accuracy may not be obtained for different data sets because image characteristics are different. On the other hand, in the method according to the first embodiment, image characteristics of inference data may be incorporated into a learning model, so that the inference accuracy is improved. For example, when comparing the first place in a matching rate, it is improved to "0.603" in the first embodiment while it is "0.437" in the reference technology. Moreover, also when comparing the 10th place in the matching rate, it is improved to "0.842" in the first embodiment while it is "0.693" in the reference technology.

In this way, the information processing apparatus 10 may learn a person feature amount suitable for a store to be inferred, improve person tracking accuracy, and implement purchasing behavior analysis with high accuracy. The information processing apparatus 10 may track buying behavior, suspicious behavior, and the like by accurately identifying a person from the plurality of surveillance cameras in the store. The information processing apparatus 10 may acquire and learn person identification data of the store to be inferred from overlapping information of image capturing areas of the plurality of cameras.

Second Embodiment

Incidentally, while the embodiment has been described above, the embodiment may be implemented in various different modes in addition to the embodiment described above.

[Numerical Values and the Like]

The number of cameras, the numerical value examples, the learning data examples, the machine learning models, the coordinate examples, and the like used in the embodiment described above are merely examples, and may be optionally changed. Furthermore, the flow of the processing described in each flowchart may be appropriately changed within a range without inconsistency. Furthermore, for each model, a model generated by various algorithms such as a neural network may be adopted. Furthermore, in the embodiment described above, the example has been described where the second machine learning unit 24b configures the person identification model 17 by using the convolutional neural network including the input layer and the intermediate layer of the trained first machine learning model, and the untrained new output layer, but the embodiment is not limited to this, and it is also possible to configure the person identification model 17 by using a part of layers of the first machine learning model. At this time, it is preferable to remove the output layer of the first machine learning model.

Furthermore, the coordinate conversion may be performed in units of image data or in units of a person bounding box. Note that the person bounding box is one example of person data, and the person detection model is one example of a third machine learning model. The image coordinate system is one example of a first index and a first coordinate system, and the floor map coordinate system is one example of a second index and a second coordinate system. Furthermore, the image data of the floor map coordinate system is one example of converted image data.

[System]

Pieces of information including a processing procedure, a control procedure, a specific name, various types of data, and parameters described above or illustrated in the drawings may be optionally changed unless otherwise specified.

Furthermore, specific forms of distribution and integration of components of individual devices are not limited to those illustrated in the drawings. For example, the preprocessing unit 22 and the data collection unit 23 may be integrated. For example, all or a part of the components may be functionally or physically distributed or integrated in optional units according to various types of loads, use situations, or the like. Moreover, all or an optional part of individual processing functions of each device may be implemented by a central processing unit (CPU) and a program analyzed and executed by the CPU, or may be implemented as hardware by wired logic.

[Hardware]

Figure 19:
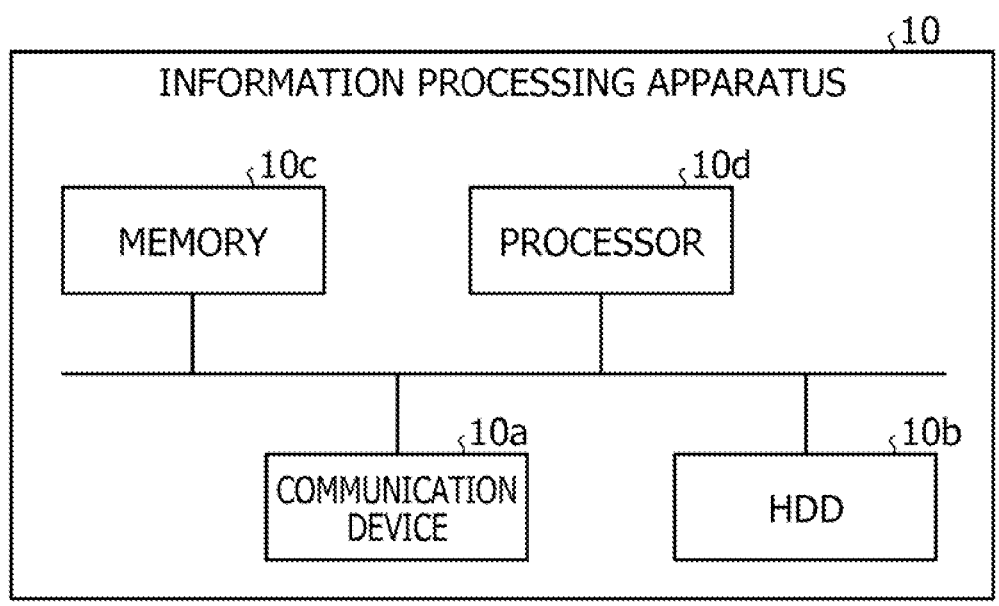
FIG. 19 is a diagram for describing an example of a hardware configuration.

FIG. 19 is a diagram for describing an example of a hardware configuration. As illustrated in FIG. 19, the information processing apparatus 10 includes a communication device 10a, a hard disk drive (HDD) 10b, a memory 10c, and a processor 10d. Furthermore, the individual units illustrated in FIG. 19 are mutually connected by a bus or the like.

The communication device 10a is a network interface card or the like, and communicates with another device. The HDD 10b stores programs and DBs that operate the functions illustrated in FIG. 5.

The processor 10d reads a program that executes processing similar to the processing of each processing unit illustrated in FIG. 5 from the HDD 10b or the like and develops the read program in the memory 10c, thereby operating a process that executes each function described with reference to FIG. 5 or the like. For example, the process executes a function similar to the function of each processing unit included in the information processing apparatus 10. For example, the processor 10d reads, from the HDD 10b or the like, a program having functions similar to the functions of the detection model generation unit 21, the preprocessing unit 22, the data collection unit 23, the identification model generation unit 24, the inference execution unit 25, and the like. Then, the processor 10d executes a process that executes processing similar to the processing of the detection model generation unit 21, the preprocessing unit 22, the data collection unit 23, the identification model generation unit 24, the inference execution unit 25, and the like.

In this way, the information processing apparatus 10 operates as an information processing apparatus that executes an information processing method by reading and executing a program. Furthermore, the information processing apparatus 10 may implement functions similar to the functions of the embodiment described above by reading the program described above from a recording medium by a medium reading device and executing the read program described above. Note that the program referred to in another embodiment is not limited to being executed by the information processing apparatus 10. For example, the embodiment described above may be similarly applied also to a case where another computer or server executes the program or a case where these cooperatively execute the program.

This program may be distributed via a network such as the Internet. Furthermore, the program may be recorded in a computer-readable recording medium such as a hard disk, a flexible disk (FD), a compact disc read only memory (CD-ROM), a magneto-optical disk (MO), or a digital versatile disc (DVD), and may be executed by being read from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a determination program for causing a computer to execute processing comprising:

acquiring a plurality of pieces of image data captured by each of a plurality of cameras;

specifying a position of a person included in each of the plurality of pieces of image data by a first index different for each of the plurality of cameras;

specifying the position of the person specified by the first index by a second index common to the plurality of cameras;

determining whether the person included in each of the plurality of pieces of image data is the same person on the basis of the specified position of the person that uses the second index; and generating, as learning data used for machine learning of a machine learning model for person identification, which executes two-class classification that identifies whether or not persons who appear in a plurality of pieces of input data are the same person and constitutes a tracking system for the same person together with a person detection model, the learning data obtained by assigning a correct answer label that indicates that the same person appears to the plurality of pieces of image data determined to be the same person, wherein the learning data is obtained by:

calculating a conversion coefficient from a first coordinate system for the plurality of cameras, which is used for the first index, to a second coordinate system for the person, which is used for the second index;

detecting first area information in which the position of the person included in each piece of image data captured at the same time by the plurality of cameras is specified in the first coordinate system;

converting the first area information into second area information of the second coordinate system by using the conversion coefficient; and acquiring a data set of pieces of the second area information positioned at equivalent coordinates in the second coordinate system among the plurality of cameras.

2. The non-transitory computer-readable recording medium according to claim 1, wherein in the processing of specifying, first converted image data obtained by converting image data of the first coordinate system captured by a first camera into the second coordinate system is generated, and second converted image data obtained by converting image data of the first coordinate system captured at the same time by a second camera into the second coordinate system is generated, and in the processing of determining, an overlapping portion where image capturing areas overlap is specified in the first converted image data and the second converted image data, and whether a person included in the overlapping portion of the first converted image data and a person included in the overlapping portion of the second converted image data are the same person is determined.

3. The non-transitory computer-readable recording medium according to claim 2, wherein in the processing of determining, a distance between each piece of first position information that indicates an existence position of each person included in the overlapping portion of the first converted image data and each piece of second position information that indicates an existence position of each person included in the overlapping portion of the second converted image data is calculated, and first position information and second position information that have the distance equal to or smaller than a threshold are extracted as pair image data of the same person.

4. A determination method comprising:
acquiring, by a computer, a plurality of pieces of image data captured by each of a plurality of cameras;
specifying a position of a person included in each of the plurality of pieces of image data by a first index different for each of the plurality of cameras;
specifying the position of the person specified by the first index by a second index common to the plurality of cameras;
determining whether the person included in each of the plurality of pieces of image data is the same person on the basis of the specified position of the person that uses the second index; and
generating, as learning data used for machine learning of a machine learning model for person identification, which executes two-class classification that identifies whether or not persons who appear in a plurality of pieces of input data are the same person and constitutes a tracking system for the same person together with a person detection model, the learning data obtained by assigning a correct answer label that indicates that the same person appears to the plurality of pieces of image data determined to be the same person,
wherein the learning data is obtained by:
calculating a conversion coefficient from a first coordinate system for the plurality of cameras, which is used for the first index, to a second coordinate system for the person, which is used for the second index;
detecting first area information in which the position of the person included in each piece of image data captured at the same time by the plurality of cameras is specified in the first coordinate system;
converting the first area information into second area information of the second coordinate system by using the conversion coefficient; and
acquiring a data set of pieces of the second area information positioned at equivalent coordinates in the second coordinate system among the plurality of cameras.

5. An information processing apparatus comprising:
a memory; and
a processor coupled to the memory and configured to:
acquire a plurality of pieces of image data captured by each of a plurality of cameras;
specify a position of a person included in each of the plurality of pieces of image data by a first index different for each of the plurality of cameras;
specify the position of the person specified by the first index by a second index common to the plurality of cameras;
determine whether the person included in each of the plurality of pieces of image data is the same person on the basis of the specified position of the person that uses the second index; and
generate, as learning data used for machine learning of a machine learning model for person identification, which executes two-class classification that identifies whether or not persons who appear in a plurality of pieces of input data are the same person and constitutes a tracking system for the same person together with a person detection model, the learning data obtained by assigning a correct answer label that indicates that the same person appears to the plurality of pieces of image data determined to be the same person,
wherein the learning data is obtained by:
calculating a conversion coefficient from a first coordinate system for the plurality of cameras, which is used for the first index, to a second coordinate system for the person, which is used for the second index;
detecting first area information in which the position of the person included in each piece of image data captured at the same time by the plurality of cameras is specified in the first coordinate system;
converting the first area information into second area information of the second coordinate system by using the conversion coefficient; and
acquiring a data set of pieces of the second area information positioned at equivalent coordinates in the second coordinate system among the plurality of cameras.

* * * * *